United States Patent
Ernenwein et al.

(10) Patent No.: US 12,115,814 B2
(45) Date of Patent: Oct. 15, 2024

(54) AXLE FOR HEAVY-DUTY VEHICLES

(71) Applicant: Hendrickson USA, L.L.C., Schaumburg, IL (US)

(72) Inventors: Keith M. Ernenwein, Hudson, OH (US); Jay D. White, North Canton, OH (US); Matthew P. Karich, Fairlawn, OH (US)

(73) Assignee: Hendrickson USA, L.L.C., Schaumburg, IL (US)

( * ) Notice: Subject to any disclaimer, the term of this patent is extended or adjusted under 35 U.S.C. 154(b) by 476 days.

(21) Appl. No.: 17/516,793

(22) Filed: Nov. 2, 2021

(65) Prior Publication Data
US 2022/0176743 A1    Jun. 9, 2022

Related U.S. Application Data

(60) Provisional application No. 63/121,320, filed on Dec. 4, 2020.

(51) Int. Cl.
| | |
|---|---|
| *B60B 35/16* | (2006.01) |
| *B60B 35/00* | (2006.01) |
| *B60B 35/04* | (2006.01) |
| *B60B 35/08* | (2006.01) |
| *F16C 3/02* | (2006.01) |
| *F16D 65/00* | (2006.01) |

(52) U.S. Cl.
CPC ............ *B60B 35/04* (2013.01); *B60B 35/004* (2013.01); *B60B 35/08* (2013.01); *B60B 2310/302* (2013.01); *B60G 2200/31* (2013.01); *F16C 3/02* (2013.01); *F16D 65/0056* (2013.01)

(58) Field of Classification Search
CPC .......... F16C 3/02; F16D 65/056; B60B 34/04; B60B 35/00; B60B 35/04; B60B 35/08; B60B 35/004
USPC ............................................... 301/124.1, 131
See application file for complete search history.

(56) References Cited

U.S. PATENT DOCUMENTS

| | | | |
|---|---|---|---|
| 4,768,839 A | 9/1988 | Spindler | |
| 5,281,005 A * | 1/1994 | Babcock ............... | F16L 37/146 301/124.1 |
| 7,066,479 B2 * | 6/2006 | Melton ................. | B60G 9/003 280/124.17 |
| 7,090,309 B2 | 8/2006 | Blessing et al. | |
| 7,401,490 B2 | 7/2008 | Copeland et al. | |
| 2011/0035622 A1 | 2/2011 | Henry et al. | |
| 2011/0175434 A1 | 7/2011 | Mackarvich et al. | |
| 2013/0207450 A1 | 8/2013 | Ebert | |

(Continued)

FOREIGN PATENT DOCUMENTS

| | | |
|---|---|---|
| EP | 0733494 | 9/1996 |
| WO | 2018081683 | 5/2018 |

OTHER PUBLICATIONS

Hendrickson Trailer Suspension Systems, Technical Procedure Intraax(r) Quaantum(tm) FX brochure, Dec. 2007.

*Primary Examiner* — Kip T Kotter
*Assistant Examiner* — Eva L Comino
(74) *Attorney, Agent, or Firm* — David P. Dureska; Benjamin J. Chojnacki; Dureska & Moore, LLC

(57) ABSTRACT

An axle for heavy-duty vehicles, the axle comprising first and second grooves formed about the axle. The first and second grooves include a cross-sectional geometry that forms integrated annular fixturing locations about the axle for selectively mounting a component of a braking system.

17 Claims, 6 Drawing Sheets

(56) References Cited

U.S. PATENT DOCUMENTS

2015/0014512 A1    1/2015  Pierce et al.
2018/0079256 A1*  3/2018  Power .................... F16D 51/24
2020/0070574 A1*  3/2020  Gregg .................. B60B 35/004

* cited by examiner

AXLE FOR HEAVY-DUTY VEHICLES

CROSS-REFERENCE TO RELATED APPLICATION

This application claims the benefit of U.S. Provisional Patent Application No. 63/121,320, filed Dec. 4, 2020.

BACKGROUND OF THE INVENTION

Field of the Invention

The present invention relates generally to axles for heavy-duty vehicles. In particular, the present invention relates to heavy-duty vehicle thin-walled axles. More particularly, the present invention relates to a heavy-duty vehicle thin-walled axle that has integrated structures for positioning and fixturing multiple types of braking components to the axle, simplifying tooling, improving the strength and accuracy of welds, and facilitating assembly without reducing the strength and durability of the axle, thereby reducing assembly time and the cost of manufacturing and materials.

Background Art

Heavy-duty vehicles typically include multiple axles that are longitudinally spaced apart along the heavy-duty vehicle to accommodate the weight of cargo and create ride stability, as is known. For the purposes of clarity and convenience, reference is made to a heavy-duty vehicle with the understanding that such reference includes trucks, tractor-trailers or semi-trailers, trailers, and the like.

Prior art axles of heavy-duty vehicles typically include a central tube having axially-opposite ends. An outboardly-extending spindle is mounted on each end of the respective central tube. A wheel end assembly and one or more wheels are rotatably mounted on each of the spindles, as is known. A pair of suspension assemblies connects each prior art axle to members of the frame or subframe of the heavy-duty vehicle. For those heavy-duty vehicles that support a subframe, the subframe can be non-movable or movable, the latter being commonly referred to as a slider box, slider subframe, slider undercarriage, secondary slider frame, or bogey. The combination of the suspension assemblies and prior art axle is generally referred to in the art as an axle/suspension system. For the purposes of clarity and convenience, reference is made to axles with the understanding that such axles are used in heavy-duty vehicle axle/suspension systems.

Prior art axles for heavy-duty vehicles are generally heavy because the central tube typically has a wall thickness in the range of from about 0.500 inches to about 0.750 inches. As a result, the heavy-duty vehicle may be limited in the amount of cargo that can be legally carried. More recently, heavy-duty vehicles have utilized prior art axles with thinner walls in order to reduce the weight of the axle/suspension system and increase the amount of cargo that may be carried. Such prior art thin-walled axles have central tubes with a wall thickness in the range of from about 0.301 inches to about 0.400 inches, but may be in the range of from about 0.225 inches to about 0.300 inches.

A heavy-duty vehicle disc or drum braking system is typically incorporated into the axle/suspension system. More specifically, certain components of the heavy-duty vehicle disc or drum braking systems, such as torque plates and brake spiders, respectively, are disposed about and fixedly mounted along the prior art axle. The location of the braking system components along the prior art axle is generally determined by the braking system structure as well as the space available within the wheel end assembly and is typically inboardly-spaced a distance from the shoulder of the spindle. Moreover, the braking system components generally require precise placement and orientation about the prior art axle to ensure optimal performance and service life of the braking system. Once the braking system components are properly positioned about the prior art axle, the components are rigidly attached to the axle using suitable means, such as welds.

As the heavy-duty vehicle is traveling over the road, the wheels encounter road conditions that impart various forces, loads, and/or stresses, collectively referred to herein as forces, to the prior art axle on which the wheels are mounted. Such forces include vertical forces caused by vertical movement of the wheels as they encounter certain road conditions, fore-aft forces caused by acceleration and deceleration of the heavy-duty vehicle and certain road conditions, and side-load and torsional forces associated with heavy-duty vehicle transverse movement, such as turning and lane-change maneuvers. Thus, prior art axles must be designed to be durable and capable of withstanding the forces applied during operation and to resist fatigue that may result from the forces applied.

Prior art axles, while adequate for the intended purpose, have potential disadvantages, drawbacks, and limitations. For example, as stated above, certain components of the braking system require precise placement along the prior art axle to ensure optimal performance and service life of the braking system. In order to ensure proper placement, the braking system components must be carefully prefixtured about the exterior of the prior art axle during assembly and welding. Prefixturing generally requires locating the braking system components on a physical location fixture that is then positioned on the axle relative to the spindle shoulder. Prefixturing the braking system components during welding may potentially cause reduced braking system component alignment and/or weld accuracy on the axle. In particular, the fixture typically includes multiple components with locating surfaces that may potentially become worn and/or damaged from repeated use and/or weld splatter. More particularly, the potential wear and/or damage to the locating surfaces of the fixture may potentially result in misalignment or non-optimal positioning of the braking system components along the prior art axle, preventing assembly of the braking system or reducing braking system performance and service life, thereby increasing operational costs.

Moreover, inaccurate welding of the braking system components may potentially impact the structure and mechanical properties of the weld interface with the braking system components and the axle, forming areas susceptible to stress, known as stress risers. These stress risers and local mechanical property changes create areas of the axle that are generally weaker, potentially reducing the fatigue resistance, durability, and service life of the axle. Moreover, prefixturing components to the prior art axle generally requires additional tools and/or workpieces. The tools or workpieces required for prefixturing typically varies depending on the braking system components that are to be mounted to the prior art axle. As a result, prefixturing the braking system components to the prior art axle increases assembly time and the cost of materials and manufacturing.

Some prior art axles have a feature, such as a single circumferential groove, spaced a distance from the spindle in order to provide the axle with a built-in alignment mechanism of mounting brake components. However, the location of the single groove on prior art axles relative to the spindle must be customized for each brake component to be mounted. As a result, different prior art axles with grooves spaced different distances from the spindle must be produced for each brake component type and/or manufacturer, increasing the cost of materials and manufacturing. In addition, the location and geometry of the single groove utilized in prior art axles potentially creates areas prone to forming stress risers, thereby decreasing the strength and durability of the axle.

Thus, there is a need in the art for an improved axle for heavy-duty vehicles that has integral structures for mounting different braking system components to a thin-walled axle and that simplifies tooling, improves the strength and accuracy of welds, facilitates installation and assembly without reducing the strength and durability of the axle, and eliminates the need for axles customized for each type and/or manufacturer of brake components, thereby reducing assembly time and the cost of materials and manufacturing.

SUMMARY OF THE INVENTION

Objectives of the present invention include providing a thin-walled axle that simplifies tooling, improves the strength and accuracy of welds, and facilitates installation and assembly without reducing the strength and durability of the axle.

A further objective of the present invention is to provide a thin-walled axle that reduces assembly time and the cost of materials and manufacturing.

These objectives and advantages are obtained by the axle for heavy-duty vehicles of the present invention, the axle comprising first and second grooves formed about the axle. The first and second grooves each include a cross-sectional geometry that forms integrated annular fixturing points about the axle, wherein a selected one or both of the grooves is utilized to mount a component of a braking system about the axle.

BRIEF DESCRIPTION OF THE SEVERAL VIEWS OF THE DRAWINGS

The exemplary embodiments of the present invention, illustrative of the best mode in which Applicant has contemplated applying the principles, are set forth in the following description, shown in the drawings, and particularly and distinctly pointed out and set forth in the appended claims.

Similar characters refer to similar parts throughout.

DESCRIPTION OF THE PREFERRED EMBODIMENT

An exemplary embodiment axle 110 (FIGS. 1-6), according to the present invention, may be incorporated into any suitable axle/suspension system (not shown) and utilized with any suitable braking system (not shown) for a heavy-duty vehicle (not shown).

Axle 110 includes a central tube 112 (partially shown) having a longitudinal central axis C. Axle 110 may be a standard axle having a diameter or dimension of about 5.0 inches with central tube 112 having a wall thickness in the range of from about 0.500 inches to about 0.750 inches. More preferably, axle 110 may be a large diameter, thin-walled axle typically having a diameter or dimension of from about 5.75 inches with central tube 112 having a wall thickness in the range of about 0.301 inches to about 0.400 inches, more preferably in the range of from about 0.310 inches to about 0.380 inches. Axle 110 also includes a pair of spindles 116 (only one shown) rigidly attached by any suitable method, such as welding, to axially opposite ends of central tube 112, as is known.

Figure 1:
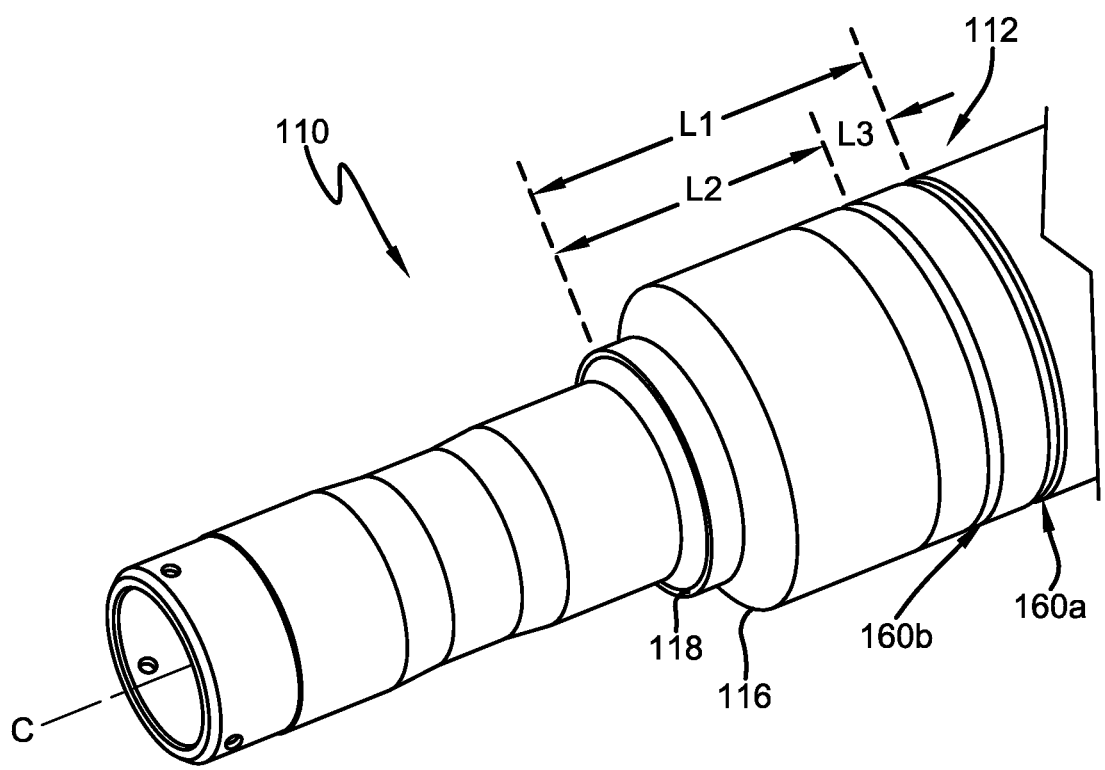
FIG. 1 is a fragmentary top perspective view of a portion of an exemplary embodiment axle according to the present invention.
Figure 2:
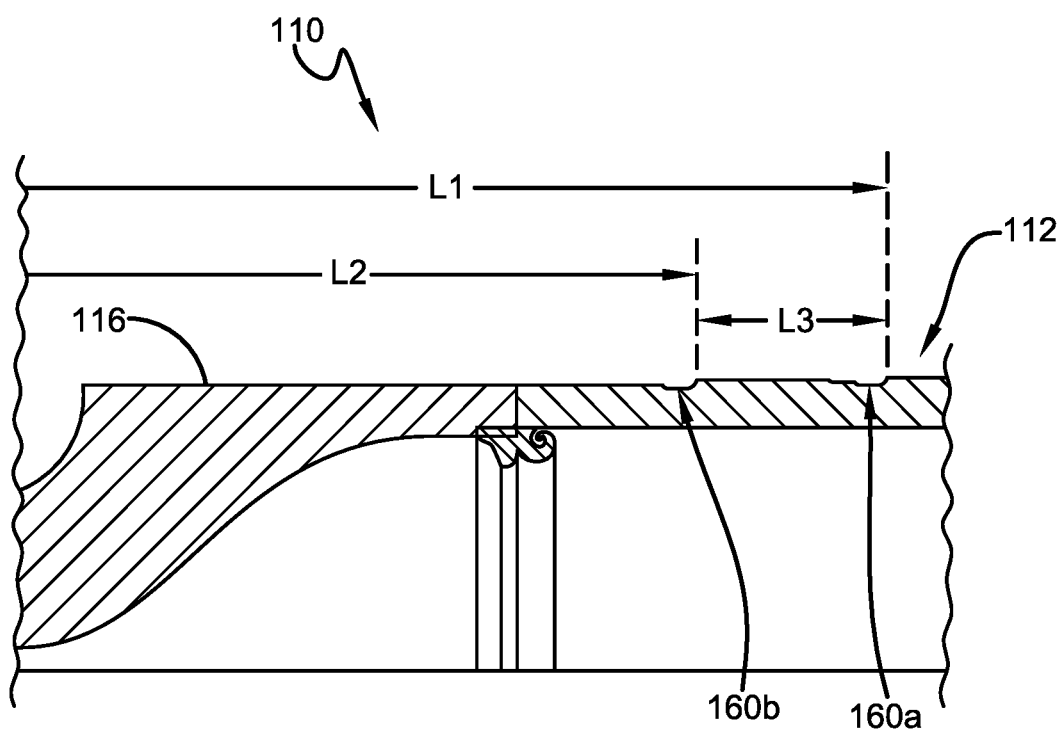
FIG. 2 is a fragmentary elevational view, in section, of a portion of the exemplary embodiment axle shown in FIG. 1.
Figure 3:
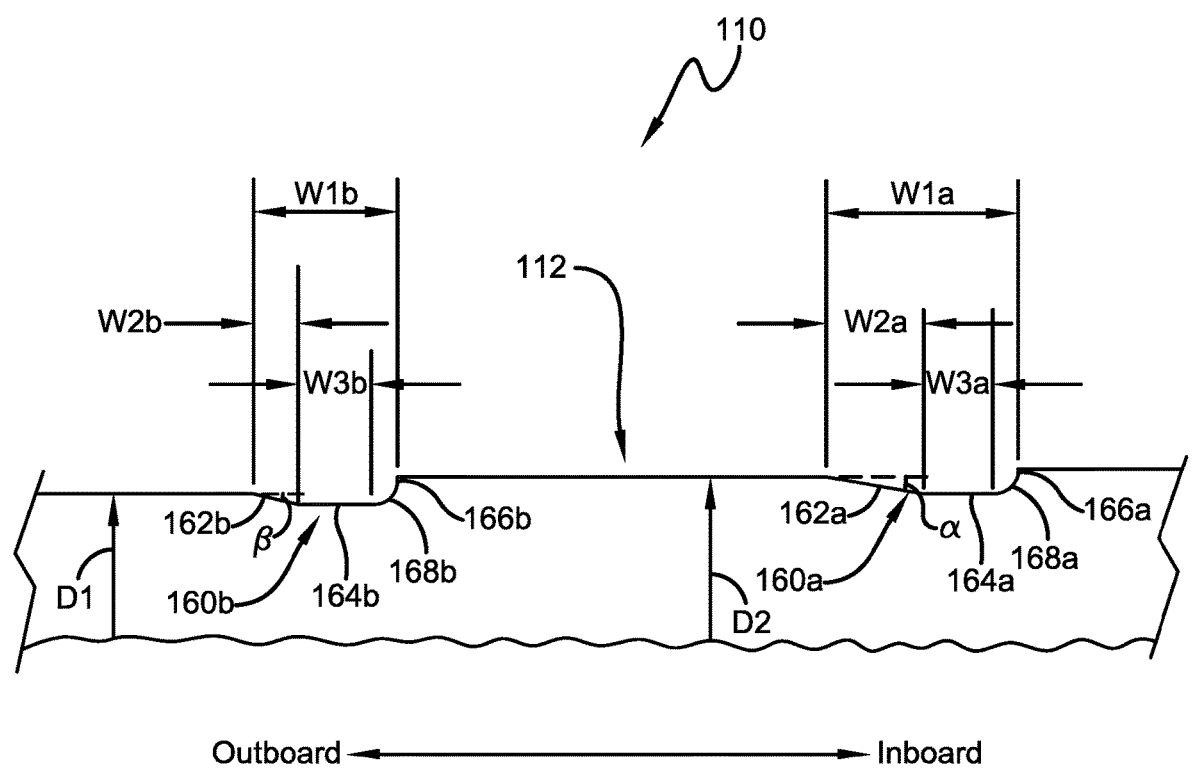
FIG. 3 is an enlarged fragmentary elevational view, in section, of a portion of the exemplary embodiment axle shown in FIGS. 1-2, showing the geometry of the outboard and inboard grooves.

In accordance with an important aspect of the invention, and with particular reference to FIGS. 2-3, each end of central tube 112 includes an annular inboard groove 160$a$ and an annular outboard groove 160$b$. It is also contemplated that each end of central tube 112 may only include either inboard groove 160$a$ or outboard groove 160$b$. Inboard and outboard grooves 160$a$, $b$, respectively, may be formed using any suitable method but are more preferably formed about central tube 112 using a lathe. Inboard groove 160$a$ extends radially inward from the outer surface of central tube 112 and axially outboard from a point that is a length or distance L1 from a shoulder 118 of spindle 116 at each end of axle 110. Distance L1 may vary in accordance with the type and size of axle 110 and/or braking system (not shown), as well as the design of braking system components (not shown) and wheel end assemblies (not shown). Distance L1 may be in the range of from about 5.0 inches to about 8.0 inches, more preferably from about 6.3 inches to about 7.3 inches. Outboard groove 160$b$ extends radially inward from the outer surface of central tube 112 and axially outboard from a point that is a length or distance L2 from the shoulder 118 of spindle 116 such that the outboard groove and inboard groove 160$a$ are separated by a length or distance L3. Distance L2 is less than distance L1 and may be in the range of from about 3.8 inches to about 6.8 inches, more preferably from about 5.1 inches to about 6.1 inches. Distance L3 generally varies in accordance with the thickness of the braking system components to be mounted to axle 110 and may be in the range of from about 0.70 inches to about 1.70 inches, more preferably from about 1.0 inches to about 1.4 inches. Inboard and outboard grooves 160$a$, $b$, respectively, are formed such that the respective planes of the grooves are parallel to each other and perpendicular to the axle.

In accordance with another important aspect of the invention, and with particular reference to FIG. 3, inboard and outboard grooves 160$a$, $b$, respectively, are formed with controlled geometry. In particular, inboard and outboard grooves 160$a$, $b$, respectively, are formed such that each of the inboard and outboard grooves extend a respective axial width or dimension W1$a$, $b$ along central tube 112. Dimension W1a of inboard groove 160a may be greater than dimension W1b and may be in the range of from about 0.20 inches to about 0.75 inches, more preferably from about 0.30 inches to about 0.40 inches. Dimension W1b of outboard groove 160b may be in the range of from about 0.03 inches to about 0.75 inches, more preferably from about 0.15 inches to about 0.35 inches. More particularly, inboard and outboard grooves 160a, b, respectively, may be formed with any suitable cross-sectional shape but are preferably formed with a generally trapezoidal cross-section. Inboard and outboard grooves 160a, b, respectively, include respective outboard inclines 162a, b; inboard planar segments 164a, b; and walls 166a, b. Inclines 162a, b are formed in the outer surface of central tube 112 and each extend inboardly over a respective axial distance or dimension W2a, W2b. Dimension W2a may be greater than dimension W2b and may be in the range of from about 0.08 inches to about 0.35 inches, more preferably from about 0.15 inches to about 0.25 inches. Dimension W2b may be in the range of from about 0.02 inches to about 0.25 inches, more preferably from about 0.04 inches to about 0.1 inches. Inclines 162a, b may also be formed such that the inclines extend progressively radially inward from the outer surface of central tube 112. As a result, inclines 162a, b provide inboard and outboard grooves 160a, b, respectively, with a progressively increasing depth inboardly along respective dimensions W2a, b such that the inclines are each formed with a respective angle $\alpha$, $\beta$. Angle $\alpha$ of incline 162a may be in the range of from about 4 degrees to about 30 degrees, more preferably from about 10 degrees to about 20 degrees. Angle $\beta$ of incline 162b may be in the range of from about 4 degrees to about 30 degrees, more preferably from about 5 degrees to about 15 degrees. It is also contemplated that angles $\alpha$, $\beta$ may vary along the respective dimensions W2a, b. Alternatively, inclines 162a, b may be formed with a curve having a large radius or a parabolic shape.

Planar segments 164a, b of grooves 160a, b, respectively, extend a respective axial distance or dimension W3a, b from the inboard end of respective inclines 162a, b to an outboard end of respective transitions 168a, b formed adjacent walls 166a, b, respectively. Dimension W3a may be greater than W3b and may be in the range of from about 0.050 inches to about 0.50 inches, more preferably from about 0.10 inches to about 0.15 inches. Distance W3b may be in the range of from about 0.050 inches to about 0.50 inches, more preferably from about 0.075 inches to about 0.125 inches. Planar segments 164a, b are generally formed with a flat cross-section such that the recesses are parallel with the outer surface of central tube 112. Alternatively, planar segments 164a, b may be formed with any suitable cross-sectional shape, such as arcuate. Planar segment 164a may be formed with a depth up to approximately 6.25% of the thickness of a region of central tube 112 inboardly of wall 166b and outboardly of incline 162a having an outside diameter or dimension D2 (partially shown). Planar segment 164b may be formed with a depth up to approximately 6.73% of the thickness of a region of central tube 112 outboardly of incline 162b having an outside diameter or dimension D1 (partially shown). Dimension D1 may be less than dimension D2. Most preferably, dimension D1 may be about 0.040 inches less than dimension D2. Planar segments 164a, b provide separation between the respective inclines 162a, b and transitions 168a, b, respectively, reducing or eliminating stress concentrations.

Transitions 168a, b are preferably formed with a rounded cross-sectional shape but may have any suitable cross-sectional shape, such as a compound radius. More specifically, transitions 168a, b may be formed with a curve having a radius in the range of from about 0.015 inches to about 0.040 inches, more preferably from about 0.025 inches to about 0.035 inches. The radius of the curvature of transition 168b may be greater than dimension D1 of central tubing 112. Similarly, the radius of the curvature of transition 168a may be greater than dimension D2 of central tubing 112. Transitions 168a, b reduce stress concentration in, and fatigue experienced by, axle 110, increasing the durability and service life of the axle. Walls 166a, b are formed in central tube 112 of axle 110 such that the walls contact or extend tangentially from transitions 168a, b, respectively, and extend radially outward perpendicular to the central tube. It is also contemplated that walls 166a, b may extend obliquely to central tube 112 with any suitable slope or incline or may have any suitable curvature or undercut.

Figure 4:
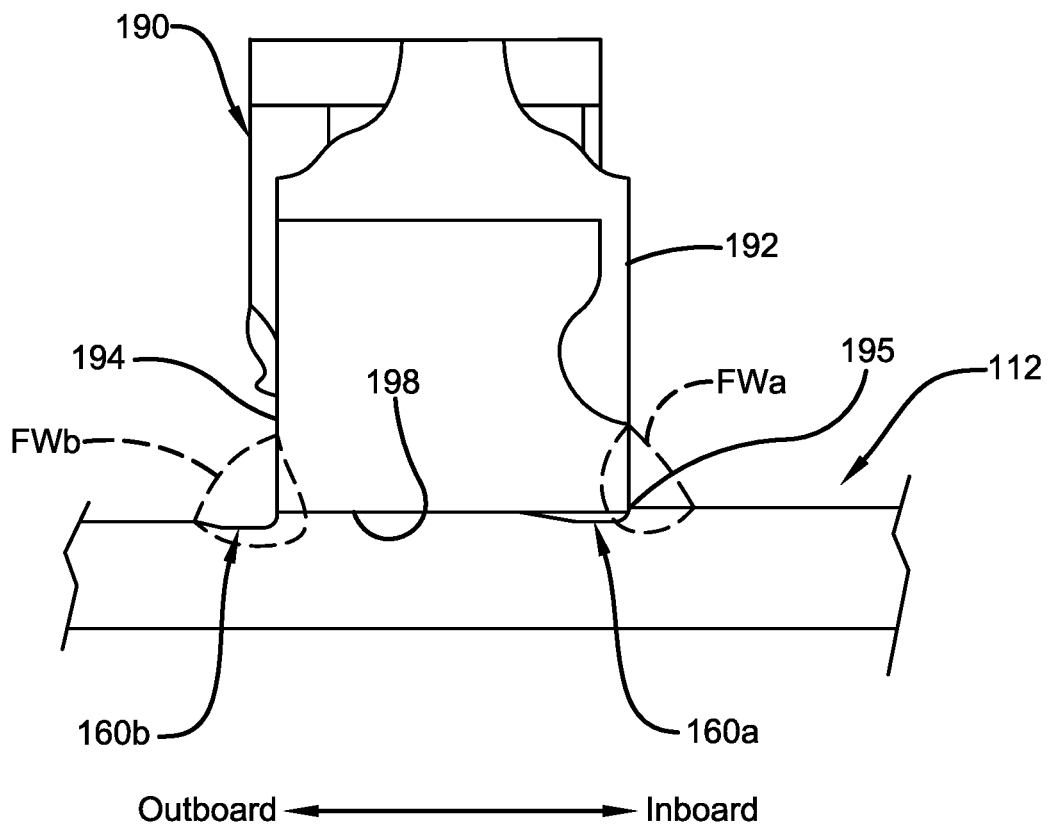
FIG. 4 is a fragmentary elevational view, in section and partially in ghost, of the exemplary embodiment axle shown in FIGS. 1-3, showing a braking system component mounted to the axle and affixed by welds.
Figure 5:
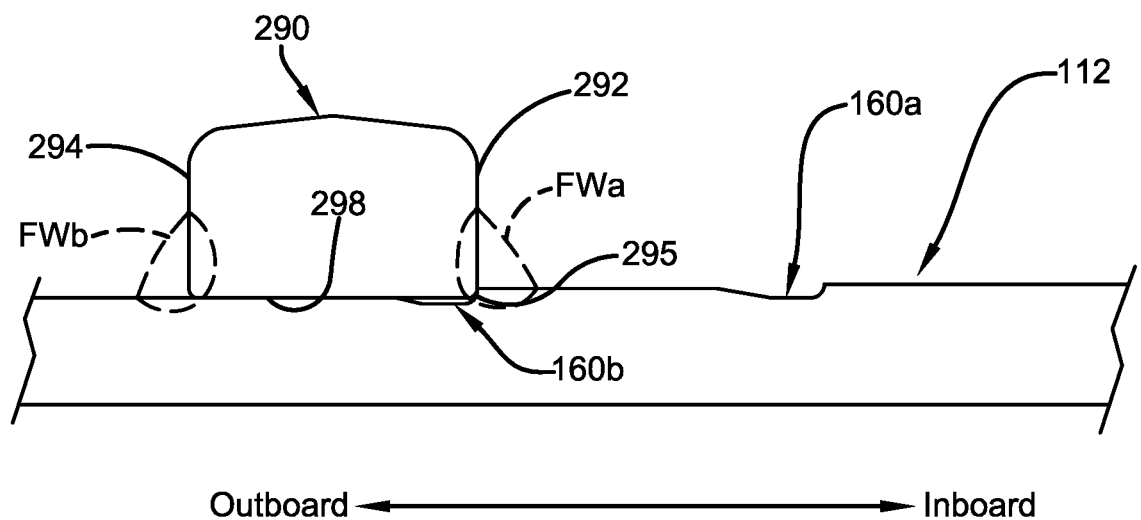
FIG. 5 is a fragmentary elevational view, in section and partially in ghost, of the exemplary embodiment axle shown in FIGS. 1-3, showing another braking system component mounted to the axle and affixed by welds.
Figure 6:
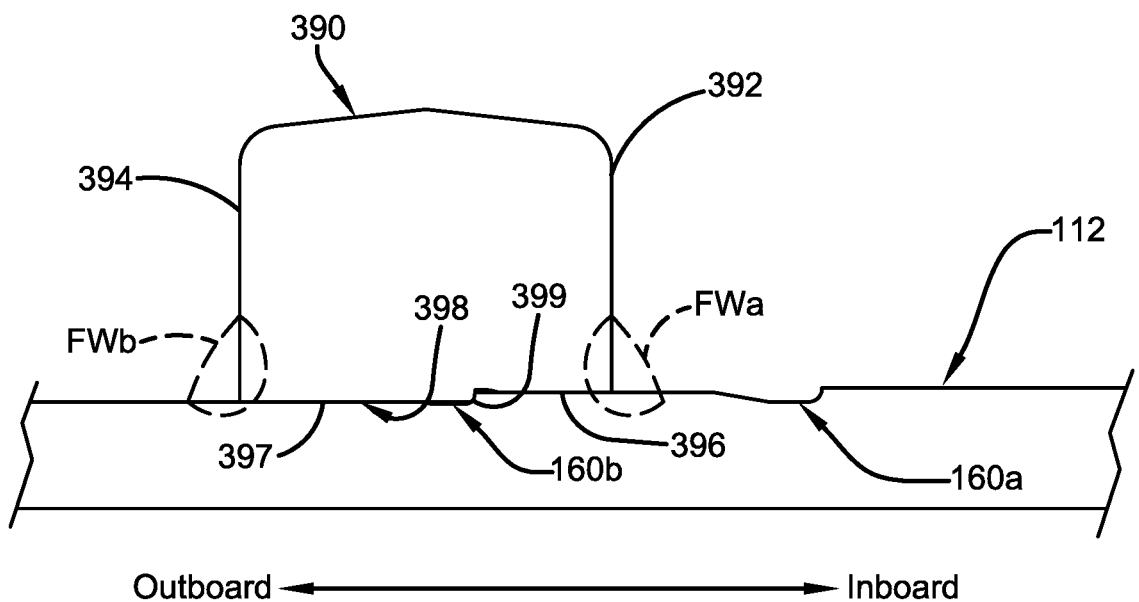
FIG. 6 is a is a fragmentary elevational view, in section and partially in ghost, of the exemplary embodiment axle shown in FIGS. 1-3, showing yet another braking system component mounted to the axle and affixed by welds.

In accordance with yet another important aspect of the present invention, and with particular reference to FIGS. 4-6, one or both of inboard and outboard grooves 160a, b, respectively, provide axle 110 with integrated, annular fixturing points for mounting various braking system components, such as brake spiders, torque plates, or the like, to the axle. More specifically, inboard and outboard grooves 160a, b, respectively, may provide reference points along central tube 112 for accurate positioning, alignment, and attachment of a braking component 190 (FIG. 4). Braking component 190 may be any type of braking component, such as a brake spider, torque plate, or the like. Braking component 190 includes an inboard face 192 and an outboard face 194. Braking component 190 may be formed with an opening 198 (partially shown) extending from inboard face 192 through the braking component to outboard face 194. Braking component 190 may be formed from any suitable material by any suitable method or combination of methods such that inboard and outboard faces 192, 194, respectively, are formed generally planar, parallel to each other, and perpendicular to opening 198. More specifically, the perpendicular relationship of inboard face 192 to opening 198 allows the inboard face to form a sharp corner 195 at the interface of the inboard face and the opening.

Braking component 190 is generally mounted on axle 110 such that central tube 112 of the axle is disposed through opening 198, forming a press fit or slip fit connection between the central tube and the braking component. More specifically, braking component 190 is disposed about central tube 112 such that corner 195 of inboard face 192 abuts and forms an interface with wall 166a of inboard groove 160a. It is also contemplated that corner 195 of inboard face 192 may abut a portion of transition 168a projecting radially beyond dimension D2 of the portion of central tube 112 measured inboardly of wall 166b and outboardly of incline 162a. Thus, wall 166a and/or a portion of transition 168a acts to provide a positive stop for braking component 190 in order to accurately position the braking component along axle 110. Moreover, because wall 166a is perpendicular to central tube 112 and because the interface between inboard face 192 and opening 198 forms corner 195 that contacts the wall or transition 168a, braking component 190, once mounted, is properly positioned axially along the central tube and accurately aligned perpendicular to axle 110. Thus, inboard groove 160a simplifies tooling by eliminating the need for prefixturing and, thus, reduces assembly time and the cost of materials and manufacturing.

In accordance with another important aspect of the present invention, outboard groove 160b provides a reference point for accurate welding of braking component 190 to axle 110. In particular, once corner 195 of inboard face 192 of braking component 190 abuts wall 166a and/or a portion of transition 168a of inboard groove 160a, outboard face 194 is also aligned with outboard groove 160b. More particularly, braking component 190 is positioned on axle 110 such that outboard face 194 may be parallel to and generally coplanar with wall 166b of outboard groove 160b. As a result, inboard and outboard grooves 160a, b provide self-location or reference points for aligning braking component 190 along axle 110 as well as for laying inboard and outboard welds FWa, b, respectively, between inboard and outboard faces 192, 194 of the braking component and central tube 112 while maintaining positioning and alignment of the braking component relative to axle 110. Because inboard and outboard grooves 160a, b, respectively, maintain positioning and alignment of braking component 190 along axle 110, robotic welding may be utilized, providing increased accuracy of the geometry of inboard and outboard welds FWa, b, respectively, thereby increasing repeatability, durability, and fatigue life of the welds while improving potential damage resistance of a brake drum (not shown) or brake rotor (not shown) and allowing for more even wear of braking surfaces (not shown). More specifically, the increased fatigue life and repeatability of welds FWa, b improves the axial position and perpendicularity of braking component 190 relative to axle 110, which avoids tipping of other components of the braking system and improves the resistance to crack initiation and growth in the brake drum or rotor, reducing the time to burnish the brake lining and allowing for more even wear of the brake lining, thereby allowing consumption of the entirety of the lining material. Outboard weld FWb may be formed along the interface between wall 166b, transition 168b, and outboard face 194 of braking component 190 and may fill or consume at least a portion of planar segment 164b and/or incline 162b. Thus, outboard weld FWb may reinforce central tube 112 about outboard groove 160b, thereby maintaining or increasing the strength, fatigue resistance, and durability of axle 110 by minimizing the possibility of the formation of stress risers. In addition, because inboard and outboard grooves 160a, b, respectively, do not require the use of prefixturing to properly position braking component 190 along central tube 112, the formation of welds FWa, b between inboard and outboard faces 192, 194, respectively, and the outer surface of central tube eliminate weld splatter build-up on locating surfaces of fixturing equipment. As a result, welds FWa, b are relatively stronger and more accurate than those requiring prefixturing and placed between prior art axles and braking components. Moreover, because braking component 190 generally extends along central tube 112 from wall 166a of inboard groove 160a to wall 166b of outboard groove 160b, the braking component bridges and may partially occupy or be disposed within planar segment 164a and/or incline 162a. As a result, braking component 190 reinforces central tube 112 about inboard groove 160a, further maintaining or increasing the strength, fatigue resistance, and durability of axle 110. It is also contemplated that an inboard weld FWa may be formed between inboard face 192 and central tube 112 along the interface between the inboard face and wall 166a and/or a portion of transition 168a of inboard groove 160a. Weld FWa may consume inboard wall 166a, transition 168a, and/or a portion of planar segment 164a.

During assembly and installation of braking component 190, the braking component may be slidingly disposed about and moved axially-inboard along central tube 112 of axle 110 until corner 195 of inboard face 192 abuts wall 166a and/or a portion of transition 168a of inboard groove 160a such that the brake component bridges planar segment 164a and incline 162a. Weld FWb may then be formed between outboard face 194 and wall 166b and/or transition 168b of outboard groove 160b, at least partially filling planar segment 164b and/or incline 162b. Weld FWa may then be formed between inboard face 192 and the outer surface of central tube 112 of axle 110 to complete attachment of braking component 190 and provide additional securement. Thus, inboard and outboard grooves 160a, b, respectively, facilitate assembly of axle 110 and braking component 190, simplifying tooling and reducing assembly time and the cost of materials and manufacturing. Thus, inboard and outboard grooves 160a, b, respectively, facilitate assembly of axle 110 and braking component 190, simplifying tooling; improving positioning of the braking component; increasing the strength and accuracy of welds FWa, b; and reducing assembly time and the cost of materials and manufacturing.

Alternatively, outboard groove 160b may provide a sole reference point along central tube 112 for accurate positioning, alignment, and attachment of another braking component 290 (FIG. 5). Braking component 290 may be any type of braking component, such as a brake spider, torque plate, or the like, and may be similar in construction and arrangement to braking component 190. More specifically, braking component 290 includes an inboard face 292 and an outboard face 294. Braking component 290 may be formed with an opening 298 (partially shown) extending from inboard face 292 through the braking component to outboard face 294. Braking component 290 may be formed from any suitable material using any suitable method or combination of methods such that inboard and outboard face 292, 294, respectively, are generally planar, parallel to each other, and perpendicular to opening 298. In particular, the perpendicular relationship of inboard face 292 to opening 298 allows the inboard face to form a sharp corner 295 at the interface between the inboard face and the opening.

Braking component 290 is generally mounted on axle 110 such that central tube 112 of the axle is disposed through opening 298, forming a press fit or clearance fit connection between the central tube and the braking component. More specifically, braking component 290 is disposed about central tube 112 such that corner 295 of inboard face 292 abuts and forms an interface with wall 166b. It is also contemplated that corner 295 may abut a portion of transition 168b of outboard groove 160b projecting above dimension D1 of central tube 112 measured outboardly of incline 162b. Thus, wall 166b and/or transition 168b acts to provide a positive stop for braking component 290 in order to accurately position the braking component along axle 110. Moreover, because wall 166b is perpendicular to central tube 112 and because the interface between inboard face 292 and opening 298 forms corner 295 and contacts the wall or transition 168b, braking component 290, once mounted, is properly positioned axially along the central tube and accurately aligned perpendicular to axle 110. Thus, outboard groove 160b simplifies tooling by eliminating the need for prefixturing and, thus, reduces assembly time and the cost of materials and manufacturing.

In accordance with another important aspect of the present invention, outboard groove 160b provides a reference point for accurate welding of braking component 290 to axle 110. More specifically, once corner 295 of inboard face 292 of braking component 290 abuts wall 166b and/or a portion of transition 168b of outboard groove 160b, the braking component is positioned on axle 110 such that outboard face 294 may be generally perpendicular to central tube 112. As a result, outboard groove 160b provides a self-location or reference point for aligning braking component 290 along axle 110 as well as for laying inboard and outboard welds FWa, b, respectively, between inboard and outboard faces 292, 294 of the braking component and central tube 112 while maintaining positioning and alignment of the braking component relative to axle 110. Because outboard groove 160b maintains positioning and alignment of braking component 290 along axle 110, robotic welding may be utilized, providing increased accuracy of the geometry of inboard and outboard welds FWa, b, respectively, thereby increasing repeatability, durability, and fatigue life of the welds while improving potential damage resistance of a brake drum (not shown) or brake rotor (not shown) and allowing for more even wear of braking surfaces (not shown). More specifically, the increased fatigue life and repeatability of welds FWa, b improves the axial position and perpendicularity of braking component 290 relative to axle 110, which avoids tipping of other components of the braking system and improves the resistance to crack initiation and growth in the brake drum or rotor, reducing the time to burnish and allowing for more even wear of the brake lining, thereby allowing consumption of the entirety of the lining material. Inboard weld FWa may be formed along the interface between wall 166b, and/or a portion of transition 168b, and inboard face 292. Weld FWa may fill or consume at least a portion of wall 166b, transition 168b, and/or planar segment 164b. It is also contemplated that outboard weld FWb may be formed between outboard face 294 and central tube 112. In addition, because outboard groove 160b does not require the use of prefixturing to properly position braking component 290 along central tube 112, the formation of welds FWa, b between inboard and outboard faces 292, 294, respectively, and the outer surface of the central tube eliminate weld splatter build-up on locating surfaces of fixturing equipment. As a result, welds FWa, b are relatively stronger and more accurate than those requiring prefixturing placed between prior art axles and braking components. Furthermore, because braking component 290 extends outboardly along central tube 112 from wall 166b of outboard groove 160b, the braking component bridges and may partially occupy or be disposed within planar segment 164b and incline 162b. As a result, braking component 290 reinforces central tube 112 about outboard groove 160b, maintaining or increasing the strength, fatigue resistance, and durability of axle 110 by minimizing the possibility of the formation of stress risers.

During assembly, braking component 290 is slidingly disposed about and moved axially-inboard along axle 110 until corner 295 of inboard face 292 contacts wall 166b and/or transition 168b of outboard groove 160b. Weld FWa may be formed between inboard face 292 and the outer surface of central tube 112 of axle 110 adjacent wall 166b to complete attachment of the braking component and provide additional securement. Weld FWb may also be formed between outboard face 294 and the outer surface of central tube 112 of axle 110. Thus, outboard groove 160b facilitates assembly of axle 110 and braking component 290, simplifying tooling; improving positioning of the braking component; increasing the strength and accuracy of welds FWa, b; and reducing assembly time and the cost of materials and manufacturing.

It is also contemplated that outboard groove 160b may provide a reference point along central tube 112 for accurate positioning, alignment, and attachment of another braking component 390 (FIG. 6). Braking component 390 may be any type of braking component, such as a brake spider, torque plate, or the like, and may be similar in construction and arrangement to braking components 190, 290. More specifically, braking component 390 includes an inboard face 392 and an outboard face 394. Braking component 390 may be formed with an opening 398 (partially shown) extending from inboard face 392 through the braking component to outboard face 394. Braking component 390 may be formed by any suitable method or combination of methods such that inboard and outboard face 392, 394, respectively, may be generally planar, parallel to each other, and perpendicular to opening 398. Alternatively, braking component 390 may be formed such that inboard and outboard faces 392, 394, respectively, may extend obliquely relative to opening 398. Opening 398 is formed with an inboard inner surface 396 and an outboard inner surface 397 that have stepped inner diameters or dimensions (not shown) corresponding to dimensions D2, D1, respectively, of central tube 112. As a result, the inner dimension of inboard inner surface 396 is generally larger than the inner dimension of outboard inner surface 397. The difference between the inner dimensions of inboard and outboard inner surfaces 396, 397 provides opening 398 with a sharp turnback or shoulder 399 formed at the interface between the stepped inboard and outboard inner surfaces. Shoulder 399 extends radially inward from braking component 390 for engagement with one of inboard or outboard grooves 160a, b, respectively. More specifically, shoulder 399 is generally reciprocal to and matingly engages and/or contacts one of walls 166a, b and/or a portion of one of transitions 168a, b of inboard or outboard grooves 160a, b, respectively.

Braking component 390 is generally mounted on axle 110 such that central tube 112 of the axle is disposed through opening 398, forming a press fit or slip fit connection between the central tube and the braking component. More specifically, braking component 390 is disposed about central tube 112 such that inboard inner surface 396 is disposed about the central tube inboardly adjacent wall 166b and outboardly adjacent incline 162a and outboard inner surface 397 is disposed about the central tube outboardly adjacent incline 162b. Shoulder 399 engages and forms an interface with wall 166b and/or a portion of transition 168b of outboard groove 160b. Thus, wall 166b and/or transition 168b provides a positive stop for braking component 390, accurately positioning the braking component along axle 110. Moreover, because wall 166b is perpendicular to central tube 112 and because shoulder 399 reciprocally engages the wall and/or a portion of transition 168b, braking component 390, once mounted, is properly positioned axially along the central tube and accurately aligned perpendicular to axle 110. Thus, outboard groove 160b simplifies tooling by eliminating the need for prefixturing and, thus, reduces assembly time and the cost of materials and manufacturing.

In accordance with another important aspect of the present invention, outboard groove 160b provides a reference point for accurate welding of braking component 390 to axle 110. More specifically, once shoulder 399 of braking component 390 abuts wall 166b and/or a portion of transition 168b of outboard groove 160b, the braking component is positioned on axle 110 such that inboard and outboard faces 392, 394 are properly aligned with central tube 112. As a result, outboard groove 160b provides a self-location or reference point for aligning braking component 390 along axle 110 and facilitates maintaining proper positioning and alignment of the braking component relative to the axle when laying inboard and outboard welds FWa, b, respectively. Because outboard groove 160b maintains positioning and alignment of braking component 390 along axle 110, robotic welding may be utilized, providing increased accuracy of the geometry of inboard and outboard welds FWa, b, respectively, thereby increasing repeatability, durability, and fatigue life of the welds while improving potential damage resistance of a brake drum (not shown) or brake rotor (not shown) and allowing for more even wear of braking surfaces (not shown). More specifically, the increased fatigue life and repeatability of welds FWa, b improves the axial position and perpendicularity of braking component 390 relative to axle 110, which avoids tipping of other components of the braking system and improves the resistance to crack initiation and growth in the brake drum or rotor, reducing the time to burnish and allowing for more even wear of the brake lining, thereby allowing consumption of the entirety of the lining material. Inboard weld FWa may be formed along the interface between face 392 and central tube 112. It is also contemplated that outboard weld FWb may be formed between outboard face 394 and central tube 112. Because outboard groove 160*b* does not require the use of prefixturing to properly position braking component 390 along central tube 112, the formation of welds FWa, b between inboard and outboard faces 392, 394, respectively, and the outer surface of central tube eliminate weld splatter build-up on locating surfaces of fixturing equipment. As a result, welds FWa, b are relatively stronger and more accurate than those placed between prior art axles and braking components and requiring prefixturing. Furthermore, because braking component 390 is disposed over outboard groove 160*b*, the braking component bridges the outboard groove such that a portion of the braking component may partially occupy or be disposed within planar segment 164*b* and/or incline 162*b*. As a result, braking component 390 reinforces central tube 112 about outboard groove 160*b*, maintaining or increasing the strength, fatigue resistance, and durability of axle 110 by maintaining the possibility of the formation of stress risers.

During assembly, braking component 390 is slidingly disposed about and moved axially-inboard along axle 110 until shoulder 399 matingly engages and contacts wall 166*b* and/or a portion of transition 168*b* of outboard groove 160*b*. Outboard weld FWb may then be formed between outboard face 394 and the outer surface of central tube 112 of axle 110. Inboard weld FWa may also be formed between inboard face 392 and the outer surface of central tube 112 to complete attachment of braking component 390 and provide additional securement. Thus, outboard groove 160*b* facilitates assembly of axle 110 and braking component 390, simplifying tooling; improving positioning of the braking component; increasing the strength and accuracy of welds FWa, b; and reducing assembly time and the cost of materials and manufacturing.

Thus, inboard and outboard grooves 160*a, b*, respectively, according to the present invention, provide integral structures for mounting different braking components, such as braking components 190, 290, 390, to axle 110 with simplified tooling and increased weld strength and accuracy and without reducing the strength and durability of the axle, thereby facilitating installation and reducing assembly time and the cost of materials and manufacturing.

It is contemplated that inboard and outboard grooves 160*a, b*, respectively, of the present invention could be utilized with all types of axles, including thick-walled axles and those types of axles other than shown and described above, without affecting the overall concept or operation. It is also contemplated that inboard and outboard grooves 160*a, b*, respectively, could be used with other types of braking components and/or reinforcing structures than those shown and described, such as sleeves, wraps, or the like, without affecting the overall concept or operation. Moreover, inboard and outboard grooves 160*a, b*, respectively, could be formed with different cross-sectional shapes and/or sizes and/or may be formed at other suitable relative positions along axle 110 without affecting the overall concept or operation of the invention.

Accordingly, the axle of the present invention is simplified; provides an effective, safe, inexpensive, and efficient structure and method, which achieve all the enumerated objectives; provides for eliminating difficulties encountered with prior art axles; and solves problems and obtain new results in the art.

In the foregoing description, certain terms have been used for brevity, clarity, and understanding, but no unnecessary limitations are to be implied therefrom beyond the requirements of the prior art because such terms are used for descriptive purposes and are intended to be broadly construed. Moreover, the description and illustration of the invention is by way of example, and the scope of the invention is not limited to the exact details shown or described.

Having now described the features, discoveries, and principles of the invention; the manner in which the axle of the present invention is used and installed; the characteristics of the construction, arrangement, and method steps; and the advantageous, new and useful results obtained, the new and useful structures, devices, elements, arrangements, process, parts, and combinations are set forth in the appended claims.

What is claimed is:

1. An axle for heavy-duty vehicles, said axle comprising:
   a central tube;
   a spindle fixed to an axial outboard end of said central tube;
   a first groove formed about said axle; and
   a second groove formed about the axle;
   said first and second grooves being formed about the central tube of the axle inboardly of an inboard end of said spindle;
   wherein the first and second grooves each include a cross-sectional geometry forming integrated annular fixturing locations about the axle, and
   wherein a selected one or both of the first and second grooves is utilized to mount a component of a braking system about the axle.

2. The axle for heavy-duty vehicles of claim 1, said axle further comprising a spindle fixed to an axial end of the axle, said spindle including a shoulder formed inboardly of said axial end;
   said first and second grooves being formed on said axle inboardly of said shoulder of the spindle.

3. The axle for heavy-duty vehicles of claim 2, said first groove being formed a first distance from said shoulder of said spindle, said first distance being in the range of from about 3.8 inches to about 6.8 inches.

4. The axle for heavy-duty vehicles of claim 3, said first distance being in the range of from about 5.1 inches to about 6.1 inches.

5. The axle for heavy-duty vehicles of claim 3, said second groove being formed a second distance inboardly from said first groove, said second distance being in the range of from about 0.70 inches to about 1.70 inches.

6. The axle for heavy-duty vehicles of claim 5, said second distance being in the range of from about 1.0 inches to about 1.4 inches.

7. The axle for heavy-duty vehicles of claim 1, said cross-sectional geometry of said first and second grooves further comprising a generally trapezoidal shape having a planar segment disposed between a wall and an incline.

8. The axle for heavy-duty vehicles of claim 7, said incline extending axially inboard and radially inward at an angle in a range of from about 4 degrees to about 30 degrees.

9. The axle for heavy-duty vehicles of claim 8, said angle being in a range of from about 5 degrees to about 15 degrees.

10. The axle for heavy-duty vehicles of claim 8, said angle being in a range of from about 10 degrees to about 20 degrees.

11. The axle for heavy-duty vehicles of claim 7, said wall being axially inboard of said incline, the wall including a transition having a radius in the range of from about 0.015 inches to about 0.040 inches.

12. The axle for heavy-duty vehicles of claim 11, said transition having a radius in the range of from about 0.025 inches to about 0.035 inches.

13. The axle for heavy-duty vehicles of claim 1, said cross-sectional geometry of one of said first and second grooves providing a stop that engages an inboard face of said component of said braking system.

14. The axle for heavy-duty vehicles of claim 13, said component further comprising an outboard face, said outboard face aligning with a portion of said cross-sectional geometry of said first groove.

15. The axle for heavy-duty vehicles of claim 1, said component of said braking system further comprising a projection;
wherein said cross-sectional geometry of said second groove matingly engages with and provides a stop for said projection.

16. The axle for heavy-duty vehicles of claim 15, said component extending across said second groove;
the component including an outboard face, said outboard face aligning with a portion of said cross-sectional geometry of said first groove.

17. An axle for heavy-duty vehicles, said axle comprising:
a first groove formed circumferentially about and radially into a radial outer support surface of said axle; and
a second groove formed circumferentially about and radially into a radial outer support surface of the axle;
wherein said first and second grooves each include a cross-sectional geometry forming integrated annular fixturing locations about the axle, and
wherein a selected one or both of the first and second grooves is utilized to mount a component of a braking system about the axle.

* * * * *